Patented July 22, 1952

2,604,462

UNITED STATES PATENT OFFICE 2,604,462

VULCANIZATION ACCELERATOR COMPRISING A MIXTURE OF A HETEROCYCLIC MERCAPTAN DERIVATIVE AND A THIOCARBAMYL AMINOMETHYL SULFIDE

Roger A. Mathes, Akron, Ohio, assignor to The B. F. Goodrich Company, New York, N. Y., a corporation of New York No Drawing. Original application March 7, 1947, Serial No. 733,191. Divided and this application June 26, 1950, Serial No. 170,467

7 Claims. (Cl. 260—79.5)

This invention relates to the vulcanization of rubbery materials, and more specifically pertains to the acceleration of the sulfur vulcanization of sulfur vulcanizable rubbery materials by use of an accelerator combination consisting of a water-insoluble metal salt of a heterocyclic nitrogen-containing mercaptan and a thiocarbamyl aminomethyl sulfide.

This application is a division of my copending application Serial No. 733,191 filed March 7, 1947, and now abandoned.

Heretofore many disadvantages have been encountered in the industrial use of thiocarbamyl aminomethyl sulfides as accelerators for the vulcanization of sulfur-vulcanizable rubber materials. One of these disadvantages lies in the fact that the thiocarbamyl aminomethyl sulfides volatilize and/or decompose at the temperatures at which the compounding and processing of rubbery materials are ordinarily effected on a factory scale. In general, such temperatures are over 120° F. and usually within the range of 130 to 200° F.

Another undesirable property of the thiocarbamyl aminomethyl sulfides, as far as industrial use is concerned, is that these compounds have a tendency to cause premature vulcanization or "scorching" in the rubber composition during compounding and processing, especially when a sufficient amount of the material is incorporated into the vulcanizable composition to compensate for that which decomposes and/or volatilizes, or when the temperature of mixing is kept sufficiently low to prevent the dissipation of the thiocarbamyl aminomethyl sulfide.

This premature vulcanization is highly undesirable since it produces isolated vulcanized masses within the unvulcanized composition which interfere with further processing. For example, when a prematurely vulcanized or "scorched" composition is processed to be used for molded goods, the composition will not flow properly to produce an acceptable molded article because of the prematurely vulcanized particles. When such a composition is calendered, the prematurely vulcanized masses are squeezed out by the calender rolls and snap back immediately after passing through the rolls to form a hole in the thin calendered sheet, and when such a composition is extruded a rough article instead of the desired smooth article is produced.

Some corrective methods have been suggested for a more efficient use of the thiocarbamyl aminomethyl sulfides as accelerators of vulcanization but most of the corrective methods proposed have been directed to the prevention of their decomposition and/or volatilization and have not appreciably lessened their tendency to cause premature vulcanization.

Vulcanization accelerators which are water-insoluble metal salts, such as the lead and zinc salts, of heterocyclic nitrogen-containing mercaptans, also have a tendency to cause premature vulcanization of rubber compositions in which they are incorporated, and this property is invariably increased when the composition also contains a material which activates their accelerating activity.

I have now discovered that the disadvantages attending the use of thiocarbamyl aminomethyl sulfides as vulcanization accelerators are overcome by vulcanizing sulfur-vulcanizable rubbery materials in the presence, as the accelerator, of a mixture consisting of (1) a water-insoluble metal salt of a heterocyclic nitrogen-containing mercaptan and (2) a thiocarbamyl aminomethyl sulfide. When so proceeding there is no volatilization or decomposition of the thiocarbamyl aminomethyl sulfide during compounding and processing prior to vulcanization. Moreover, this mixture of vulcanization accelerators exhibits little or no tendency to cause premature vulcanization or "scorching" in rubbery compositions. This latter property is quite unexpected since, in general, the thiocarbamyl aminomethyl sulfides function in rubbery compositions as activators for heterocyclic nitrogen-containing mercaptan accelerators and would be expected to increase the scorching tendency of the mercaptan salt rather than bringing about a reduction of the scorching property.

Any desired thiocarbamyl aminomethyl sulfides may be used in preparing the accelerator mixtures used in this invention. Such compounds possess the following general structural formula:

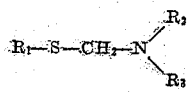

wherein $R_1$ is a thiocarbamyl group and the structure

represents the residue derived by removing a hydrogen atom from a primary or secondary amine.

For example, $R_1$ may be the unsubstituted thiocarbamyl radical or substituted thiocarbamyl radicals such as dimethylthiocarbamyl, diethylthiocarbamyl, ethylbenzylthiocarbamyl, dibenzylthiocarbamyl, dicyclohexylthiocarbamyl, methyl-phenylthiocarbamyl, diphenylthiocarbamyl phenyl-beta-naphthylthiocarbamyl, di-beta-naphthylthiocarbamyl, di-xenylthiocarbamyl, di-o-, m-, or p-tolyl-thiocarbamyl, dianthrylthiocarbamyl, cyclopentamethylenethiocarbamyl derived from piperidine, cyclo(ethylene-oxy-ethylene)-thiocarbamyl derived from morpholine, phenylthiocarbamyl and other thiocarbamyl radicals of the structure.

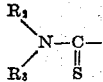

wherein

represents the residue derived by removing a hydrogen atom from a primary or secondary amine.

Similarly either or both of $R_2$ and $R_3$ in the amino methyl

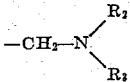

part of the molecule may be methyl, ethyl, isopropyl, cyclohexyl, benzyl, methoxymethyl, hydroxyethyl, aminoethyl or other alkyl, cycloalkyl, aralkyl, hydroxyalkyl, alkoxyalkyl or other aliphatic or alicyclic radicals, or such aromatic radicals as phenyl, tolyl, naphthyl, cumyl, cymyl, anthryl, phenanthryl, xenyl, anisyl, anilinophenyl, etc. Either $R_2$ or $R_3$ may be hydrogen but not both at the same time. $R_2$ and $R_3$ may be identical groups or they may be different. $R_2$ and $R_3$ may also be joined to form such cyclic groups as cyclopentamethylene derived from piperidine and cyclo(ethylene-oxy-ethylene) derived from morpholine.

Specific compounds within this class hereinbefore defined include dimethylthiocarbamyl dimethylaminomethyl sulfide, dimethylthiocarbamyl diethylaminomethyl sulfide, diethylthiocarbamyl diethylaminomethyl sulfide, diethylthiocarbamyl dimethylaminomethyl sulfide, diethylthiocarbamyl cyclopentamethyleneaminomethyl sulfide, cyclopentamethylenethiocarbamyl cyclopentamethyleneaminomethyl sulfide, cyclopentamethylenethiocarbamyl diethylaminomethyl sulfide, diphenylthiocarbamyl diethylaminomethyl sulfide, dimethylthiocarbamyl diphenylaminomethyl sulfide, dimethylthiocarbamyl o-, m- or p-tolylaminomethyl sulfide, cyclopentamethylenethiocarbamyl diphenylaminomethyl sulfide, cyclopentamethylenethiocarbamyl o-, m- or p-tolylaminomethyl sulfide, diphenylthiocarbamyl anilinomethyl sulfide, cyclo(ethylene-oxy-ethylene)-thiocarbamyl cyclo(ethylene-oxy-ethylene)-aminomethyl sulfide, cyclo(ethylene-oxy-ethylene)-thiocarbamyl diethylaminomethyl sulfide, cyclo(ethylene-oxy-ethylene)-thiocarbamyl anilinomethyl sulfide, cyclo(ethylene-oxy-ethylene)-thiocarbamyl o-, m- or p-tolylaminomethyl sulfide, phenyl-beta-naphthylthiocarbamyl cyclohexylaminomethyl sulfide, di-beta-naphthylthiocarbamyl dimethyl aminomethyl sulfide and the like.

In general these thiocarbamyl aminomethyl sulfides can be made by reacting formaldehyde with an aqueous solution of a water-soluble metallic dithiocarbamate and an amine hydrochloride. The following reaction equation illustrates this process:

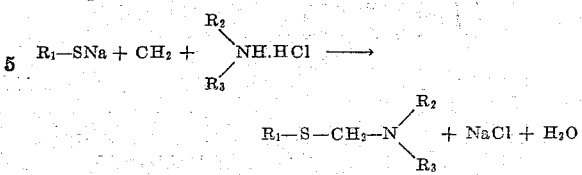

where $R_1$ is the thiocarbamyl group derived from the dithiocarbamate employed and $R_2$ and $R_3$ have the same meaning as above. This reaction is readily carried out at a temperature of about 0 to 40° C.

The water-insoluble metal salt of a heterocyclic nitrogen-containing mercaptan which is combined with the thiocarbamyl aminomethyl sulfide to form the mixture used according to this invention can be any alkaline earth or heavy metal salt, such as those of calcium, barium, iron, zinc, lead, manganese, cobalt, and nickel, such heterocyclic nitrogen-containing mercaptans as mercaptoalkylthiazoles, mercaptoarylenethiazoles, mercaptooxazoles, mercaptothiazolines, mercapto oxazolines, mercaptothiazines, mercaptothiodiazoles, mercaptoquinolines, and mercaptothioimidazoles. Although any water-insoluble metal salt of the above-named mercapto compounds can be employed, I have found that the use of the zinc or lead salts of heterocyclic nitrogen-containing mercaptans in which the heterocyclic ring possesses the structure

where X represents hydrocarbon structure, and the mercapto group is connected to the carbon between the nitrogen and sulfur has given the best results and for this reason are the preferred metal salts for the purposes of this invention.

Preferably, the accelerator compositions used according to this invention are prepared in three steps. First, the water-insoluble metallic salt of the heterocyclic nitrogen-containing mercaptan is prepared by adding the heterocyclic nitrogen-containing mercaptan to an aqueous solution of sodium hydroxide to form the water-soluble sodium mercaptide and then a water-soluble salt of the desired metal such as zinc chloride or lead nitrate is added to the sodium mercaptide solution to form the zinc or lead salt as a precipitate. Second, the thiocarbamyl aminomethyl sulfide is then separately prepared as described above. Third, the two previously prepared slurries are mixed with stirring, the resulting slurry is filtered and the filtering cake is dried at about 50° C. at atmospheric pressure. The dried product is usually a fine powdery material which may be difficult to handle in the mixing and compounding with rubber but this can be overcome by incorporating one of the commonly used oil softeners or even a light motor oil during the mixing of the two slurries.

The following example describes the preparation of a specific accelerator composition employing a specific lead mercaptide and a specific thiocarbamyl aminomethyl sulfide. The parts reported herein are by weight.

EXAMPLE I (A) 35 parts of 2-mercapto-4,5-dimethylthiazole were dissolved in an aqueous sodium hydroxide solution containing 10 parts of sodium hydroxide in 600 parts of water. An aqueous solution containing 43 parts of lead nitrate in 250 parts of water were added to the sodium mercaptide solution with stirring. A heavy yellow precipitate formed which is the lead salt of the mercaptothiazole.

(B) 23 parts of a 25% by weight aqueous solution of dimethylamine were added to 80 parts of water together with 10 parts of a 50% by weight aqueous solution of sodium hydroxide. While stirring the resulting aqueous solution and maintaining a reaction temperature of about 20° C. 9.5 parts of carbon disulphide were slowly added to the reaction mixture. The product of this reaction thus far which is an aqueous solution containing mainly sodium dimethyl dithiocarbamate was then reacted with 10.5 parts of a 37% by weight aqueous formaldehyde solution and 18 parts of ortho-toluidine hydrochloride dissolved in 60 quarts of water. During this reaction the temperature was maintained at about 20° C. by external cooling. The resulting product, dimethylthiocarbamyl ortho-tolyl-aminomethyl sulfide, formed as a heavy white precipitate.

(C) The slurries of parts A and B were then mixed and vigorously stirred while 10 parts of SAE #20 motor oil were slowly added. The resulting tan colored slurry was filtered, washed with water and dried at 45 to 50° C. at atmospheric pressure. 95 parts of the dried products representing a 95% yield was recovered. This product was a practically odorless light brown powder which does not have a definite melting point. The composition of this resulting combination product corresponded to that of a product containing 60% lead salt of the mercaptothiazole, 30% of the thiocarbamyl aminomethyl sulfide and 10% oil.

Other similar combination products were prepared in the same manner by substituting for the slurry of the lead salt of 2-mercapto-4,5-dimethylthiazole slurries containing the same amounts by weight of such preferred metal salts as the zinc salt of 2-mercapto-4,5-dimethylthiazole, the zinc and lead salts of 2-mercapto-4,6,6-trimethylthiazine, the zinc and lead salts of 2-mercaptobenzothiazole and the zinc and lead salts of 2-mercaptothiazoline.

Such thiocarbamyl aminomethyl sulfides, as for example, dimethylthiocarbamyl phenylaminomethyl sulfide, diethylthiocarbamyl diethylaminomethyl sulfide, cyclopentamethylene thiocarbamyl cyclopentamethylene aminomethyl sulfide, diphenylthiocarbamyl diethylaminomethyl sulfide, cyclo(ethylene-oxy-ethylene)-thiocarbamyl diethylaminomethyl sulfide and phenyl beta-naphthyl-thiocarbamyl cyclohexylaminomethyl sulfide were also used with the above metal salts to prepare compositions of my invention.

In preparing the accelerator mixtures which are useful according to this invention, the ratio of the metal salt to that of the thiocarbamyl aminomethyl sulfide can be varied from equal parts by weight of each compound to that of 5 parts of the metal salt to one part of the thiocarbamyl aminomethyl sulfide, but the products containing the components in a ratio of 2 parts of the metal salt to one part of the thiocarbamyl aminomethyl sulfide has been found to give the best results.

The process for preparing the mixed accelerators in their preferred form can be varied in many ways. For example, the coating material can be added as in Example I, or may be added to the dry product resulting from the mixing of the two slurries and filtering. Also, oils in fatty acids commonly used in rubber compounding such as light mineral oils, pine oils, stearic acid, oleic acid and others can be used as coating materials if desired without interfering with the vulcanization accelerating activity of the mixture of accelerators.

The mixture containing the water-insoluble salt of a hetero-cyclic nitrogen-containing mercaptan and a thiocarbamyl aminomethyl sulfide can be used with equal success as vulcanization accelerator either as the preferred coated form or as the uncoated form, but the preferred form has the advantage of being more easily incorporated and dispersed in the rubber composition.

This use of these mixed accelerators either in the coated or uncoated form also provide an additional advantage over either of the individual accelerator components in that there is no need to cool the compounding and processing equipment to prevent scorch during the various steps encountered in factory processing procedures, for, as it will be demonstrated, these mixtures will not cause appreciable scorch even at 227° F. which is relatively high when compared to the usual processing and compounding temperatures of from 130 to 200° F.

A common method used to determine whether or not an accelerator of vulcanization will cause prevulcanization or scorch is to incorporate the accelerator in a sulfur vulcanizable composition and heat the composition at a temperature which is relatively low as compared with the temperatures usually employed in vulcanizing that particular rubber composition. If the tensile strength of the resulting heated composition is low, the accelerator is said to be non-scorching. Accordingly, when the tensile strength of the resulting heated composition is high the accelerator is said to be scorching.

In the following examples, the results of which are listed in tabular form in Table I, the following tire tread stock compositions were employed, in which the parts by weight were prepared:

*Composition A*

| | Parts |
|---|---|
| Natural rubber | 100 |
| Channel Black | 50 |
| Zinc oxide | 5 |
| Sulfur | 3 |
| Stearic acid | 3.5 |
| Pine tar | 3.0 |
| Antioxidant | 1.0 |
| Accelerator as noted in Table I | |

*Composition B*

| | Parts |
|---|---|
| Copolymer of butadiene and styrene prepared in the presence of rosin acid soap | 100 |
| Channel Black | 47.5 |
| Zinc oxide | 2.5 |
| Antioxidant | 1.0 |
| Petroleum oil softener | 10.0 |
| Sulfur | 2.0 |
| Accelerator as noted in Table I | |

Into the above composition there was incorporated the lead salt of 2-mercapto-4,5-dimethylthiazole, dimethylthiocarbamyl ortho-tolylaminomethyl sulfide and the product of Example I. The resulting mixtures were given the following designation. Example II, Composition A, plus 0.75 part of the lead salt of 2-mercapto-4,5-dimethylthiazole. Example III, Composition A, plus 0.3 part of dimethylthiocarbamyl ortho-tolylaminomethyl sulfide. Example IV, Composition A, plus 0.5 part of the product of Example I. Example V, Composition B, plus 1.5 part of the lead salt of 2-mercapto-4,5-dimethylthiazole. Example VI, Composition B, plus 0.7 part of dimethylthiocarbamyl ortho-tolylaminomethyl sulfide, and Example VII, Composition B, plus 0.8 part of the combination products of Example I. The resulting mixtures were heated in a press at 227° F. for the time shown in the following table. The tensile strength of the test pieces was determined and reported as T, the ultimate tensile strength in pounds per square inch. The temperature of 227° F. is relatively low for the vulcanization of tire tread composition and approaches the temperatures incurred during compounding of such mixture.

TABLE I

| Example | Time of Vulcanization in Min. at 227° F. | T |
|---|---|---|
| II | 60 | 950 |
| III | 60 | 1,100 |
| IV | 60 | 375 |
| V | 120 | 350 |
| VI | 120 | 1,900 |
| VII | 120 | 75 |

From a comparison of the tensile strength of the vulcanizate of Example IV, prepared by the process of this invention, with those for the vulcanizates of Examples II and III which employ the components utilized to make the accelerator employed in Example IV, it is readily apparent that the product of Example I is not as scorchy as is its components. A composition similar to that used in Example IV but containing 1.0 part of 2-mercapto benzothiazole, a commonly employed accelerator of vulcanization when heated at 227° F. for 60 minutes has an ultimate tensile strength of 700 lbs. per sq. in. Accordingly, the products of Example I would be considered non-scorching. From a similar comparison of Example VII with Examples V and VI, it is apparent that the product of Example I is also non-scorching in a synthetic rubber sulfur vulcanizable composition.

The following Table II will further illustrate the results which can be obtained by following this invention. Example VIII is a composition made up of the ingredients of Composition A plus 0.5 part of the product of Example I, and Example IX is a composition made up of the ingredients of Composition B plus 0.8 part of the product of Example I. Both compositions were vulcanized by heating at 280° F. in a press for the time shown in Table II, where T is the ultimate tensile strength in pounds per square inch and E is the percent elongation.

TABLE II

| Example | Time of Vulcanization in Minutes | T | E |
|---|---|---|---|
| VIII | 15 | 3,750 | 745 |
|  | 30 | 4,250 | 700 |
|  | 45 | 4,375 | 665 |
|  | 75 | 4,425 | 640 |
| IX | 30 | 2,000 | 615 |
|  | 60 | 2,275 | 565 |
|  | 75 | 2,425 | 545 |
|  | 120 | 2,400 | 520 |

Without an accelerator, the rubber compositions A and B should be vulcanized in about three hours but the tensile strength of the resulting vulcanizate would be only about one-half of the above values.

The accelerator mixtures described herein are useful in accelerating the sulfur vulcanization of any sulfur-vulcanizable polymeric organic rubbery materials, especially the polymeric unsaturated rubbery materials. Examples of such rubbery materials are all varieties of natural crude rubber (a rubbery material which is considered as a polymer containing multiple isoprene units) and synthetic diene polymers. Examples of the latter include among others polymers of butadiene, isoprene, 2,3-dimethyl butadiene, piperylene and the like, and copolymers of these compounds with acrylonitrile, styrene, methyl acrylate, methyl methacrylate, isobutylene and other copolymerizable monomers. These accelerator mixtures may be added to the rubber on a roll mill or in an internal mixer or by any other suitable method. Other compounding ingredients such as any of the ordinary pigments, fillers, antioxidants, or other accelerators of vulcanization may also be employed. Small quantities may be used to achieve the desired result, either as vulcanization activators or accelerators. In general 0.1 to 5% or more based on the rubber composition may be used.

While I have disclosed specific examples of my invention, I do not thereby desire or intend to limit myself solely thereto for as hitherto stated the precise proportions of the materials utilized may be varied and other equivalent materials may be employed if desired without departing from the spirit and scope of the invention as defined in the appended claims.

I claim:

1. The method of vulcanizing a sulfur-vulcanizable polymeric organic rubbery material which comprises incorporating into a mixture containing sulfur and said rubbery material from 0.1% to 5% by weight based on the rubbery material of a composition comprising (1) a water-insoluble metal salt of a heterocyclic nitrogen-containing mercaptan whose ring possesses the structure

wherein X represents a hydrocarbon structure and in which the mercapto group is connected to the ring carbon atom between the nitrogen and sulfur atoms and (2) a thiocarbamyl aminomethyl sulfide of the structure

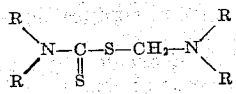

wherein

represents a radical derived from an amine by removing a hydrogen atom attached to the amine nitrogen atom, said composition containing 1 to 5 parts of the metal salt for each part of the thiocarbamyl aminomethyl sulfide, and then heating the resulting mixture until vulcanized.

2. The method of vulcanizing a sulfur-vulcanizable polymeric organic rubbery material which comprises incorporating into a mixture containing the rubbery material and sulfur from 0.1% to 5% by weight based on the rubbery material of a composition comprising (1) a lead salt of a heterocyclic nitrogen-containing mercaptan whose heterocyclic ring possesses the structure

wherein X is a hydrocarbon structure and in which the merapto group is connected to the ring carbon atom between the nitrogen and sulfur atoms and (2) a thiocarbamyl aminomethyl sulfide of the structure

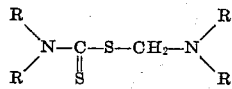

wherein

represents a radical derived from an amine by removing a hydrogen atom attached to the amine nitrogen atom, said composition containing 1 to 5 parts of the lead salt for each part of the thiocarbamyl aminomethyl sulfide, and then heating the resulting mixture until vulcanized.

3. The method of vulcanizing a polymeric organic rubbery material which comprises incorporating into a mixture containing the rubbery material and sulfur from 0.1% to 5% by weight based on the rubbery material of a composition comprising the lead salt of a 2-mercaptothiazole and dimethylthiocarbamyl ortho-tolyl-aminomethyl sulfide in the proportion of 1 to 5 parts of the lead salt for each part of the aminomethyl sulfide, and then heating the resulting mixture until vulcanized.

4. The method of vulcanizing natural rubber which comprises incorporating into a mixture containing natural rubber and sulfur from 0.1% to 5% based on the rubber of a composition comprising the lead salt of 2-mercapto-4,5-dimethyl-thiazole and dimethylthiocarbamyl ortho-tolyl-aminomethyl sulfide in the proportion of 1 to 5 parts of the lead salt for each part of the aminomethyl sulfide, and then heating the resulting mixture until vulcanized.

5. The method of vulcanizing a rubbery copolymer of butadiene-1,3 and styrene which comprises incorporating into a mixture containing the rubbery copolymer and sulfur from 0.1% to 5% by weight based on the rubbery copolymer of a composition comprising the lead salt of 2-mercapto-4,5 dimethylthiazole and dimethylthiocarbamyl ortho-tolyl-aminomethyl sulfide in the proportion 1 to 5 parts of the lead salt for each part of the aminomethyl sulfide, and then heating the resulting mixture until vulcanized.

6. A vulcanizate prepared by the method of claim 1.

7. A vulcanizate prepared by the method of claim 3.

ROGER A. MATHES.

REFERENCES CITED

The following references are of record in the file of this patent:

UNITED STATES PATENTS

| Number | Name | Date |
|---|---|---|
| 2,283,337 | Neal et al. | May 19, 1942 |